(12) United States Patent
Anwer et al.

(10) Patent No.: US 11,349,774 B2
(45) Date of Patent: May 31, 2022

(54) METHODS, SYSTEMS AND COMPUTER READABLE MEDIA FOR DIAGNOSING NETWORK FUNCTION VIRTUALIZATION PERFORMANCE

(71) Applicants: AT&T Intellectual Property I, L.P., Atlanta, GA (US); President and Fellows of Harvard College, Cambridge, MA (US)

(72) Inventors: Muhammad Bilal Anwer, Branchburg, NJ (US); Aman Shaikh, Berkeley Heights, NJ (US); Junzhi Gong, Cambridge, MA (US); Minlan Yu, Cambridge, MA (US); Yuliang Li, Cambridge, MA (US)

(73) Assignees: AT&T Intellectual Property 1, L.P., Atlanta, GA (US); President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 16/714,117

(22) Filed: Dec. 13, 2019

(65) Prior Publication Data
US 2021/0184988 A1 Jun. 17, 2021

(51) Int. Cl.
| | | |
|---|---|---|
| H04L 12/923 | (2013.01) | |
| H04L 47/762 | (2022.01) | |
| H04L 47/74 | (2022.01) | |
| H04L 43/0876 | (2022.01) | |
| H04L 47/52 | (2022.01) | |
| H04L 43/062 | (2022.01) | |
| H04L 47/80 | (2022.01) | |

(52) U.S. Cl.
CPC .......... *H04L 47/762* (2013.01); *H04L 43/062* (2013.01); *H04L 43/0876* (2013.01); *H04L 47/522* (2013.01); *H04L 47/746* (2013.01); *H04L 47/748* (2013.01); *H04L 47/803* (2013.01)

(58) Field of Classification Search
CPC . H04L 41/5009; H04L 41/5038; H04L 43/08; H04L 43/10; H04L 45/123; H04L 47/2425
USPC ....................................................... 370/230
See application file for complete search history.

(56) References Cited

U.S. PATENT DOCUMENTS

| | | | | |
|---|---|---|---|---|
| 10,462,034 | B2 * | 10/2019 | Nageshappa | H04L 67/10 |
| 2018/0123930 | A1 * | 5/2018 | Zhang | H04L 43/10 |
| 2018/0316620 | A1 * | 11/2018 | Llorca | H04L 67/10 |
| 2019/0028347 | A1 * | 1/2019 | Johnston | H04L 43/08 |
| 2019/0081871 | A1 * | 3/2019 | Nazar | H04L 43/0823 |
| 2019/0303203 | A1 * | 10/2019 | Guan | G06F 9/5005 |

(Continued)

*Primary Examiner* — Robert J Lopata
(74) *Attorney, Agent, or Firm* — Guntin & Gust, PLC; Dana LeMoine (57) ABSTRACT

Performance issues in a service function chain having a plurality of resources and a plurality of network functions each having a network function queue are diagnosed. Each network function queue is monitored and queueing information for input packets for each of the plurality of network functions is dumped to a data store. Each resource that is under contention is identified as well as which of the network functions is a contender for the resources. A diagnosing algorithm is used to diagnose performance problems and an impact graph for each victim packet is generated. A summary of results as a list of rules is then provided.

20 Claims, 4 Drawing Sheets

(56) References Cited

U.S. PATENT DOCUMENTS

| | | | |
|---|---|---|---|
| 2019/0342187 A1* | 11/2019 | Zavesky | H04L 41/5009 |
| 2020/0028787 A1* | 1/2020 | Mehra | H04L 47/125 |
| 2020/0145299 A1* | 5/2020 | Do | H04L 41/082 |
| 2020/0359359 A1* | 11/2020 | Sethi | H04L 41/08 |
| 2020/0396139 A1* | 12/2020 | Shin | H04L 41/5054 |
| 2021/0037400 A1* | 2/2021 | Yao | H04W 24/08 |

* cited by examiner

METHODS, SYSTEMS AND COMPUTER READABLE MEDIA FOR DIAGNOSING NETWORK FUNCTION VIRTUALIZATION PERFORMANCE

STATEMENT REGARDING FEDERALLY SPONSORED RESEARCH OR DEVELOPMENT

This invention was made with Government support under grant 1413978 awarded by the National Science Foundation. The Government has certain rights in the invention.

TECHNICAL FIELD

The present disclosure relates to network communication methods systems and computer readable media. More particularly, the disclosure relates to a method, system, and computer program for diagnosing performance of network function virtualization.

BACKGROUND

A telecommunication's network operator can deploy a large number of services in its networks. These services include but are not limited to voice, data and video services. In modern networks, NFV (network function virtualization) has been replacing middleboxes, because NFV runs network functions (NFs) on software platform, which achieves high flexibility in developing new functionalities, helps network operators to deploy network functions easily, and requires low cost in network function management. However, compared to middleboxes, NFV is more error-prone, and traffic in NFV often experiences long tail latency or occasional packet drops. Usually, people simply blame the "software" nature and neglect it. However, as the long tail latency becomes more significant in applications' performance, there is a need to better understand the NFV performance issue.

Service function chains consisting of NFs and virtual network functions (VNFs) are the easiest way to realize these services. Each service function chain can have many NFs/VNFs and each network function can have many instances. With a large number of network function instances that might share same physical infrastructure it is important that a network operator has the ability to quickly detect latency and packet drop issues. As these issues can amplify into service issues impacting quality of service/experience of the end users. With a large set of network function instances, it is difficult for network operators to manually analyze the traffic logs to understand the service problems. Additionally, these problems can disappear even before network operator is done with analysis.

Performance issues in NFV stem from the "temporal resource contention". There are various types of resource contentions that can impact NFV performance, including the queue, the CPU, the cache, etc. Each resource has different types of contenders:

Queue: bursts of flows arriving into the queue.
CPU: bursts of flows at other NFs, interrupts, or other CPU usage.
Cache: bursts of flows at other NFs, or other cache usage.

Diagnosis in NFV is challenging. First, usually there are multiple resource contentions mixed together, and each could involve many contenders. Each NF may be bound with a queue, cache resource, and CPU resource. It is hard to figure out how each resource contention contributes to the problem. Second, a local view of diagnosis is not sufficient. So, for example, if the performance problem happens in a firewall, then checking resource contentions within firewall (queue in firewall, cache and CPU) is not enough, because the root cause can also come from an NAT (e.g., the NAT sends out bursts of traffic), which is a hop away from the firewall. Third, the long latency of a packet is not only impacted by the resource contention during the processing of it, but also the contention in history.

There is a need to monitor NFV performance and diagnose performance problems without the need to manually analyze traffic logs to understand the service problems.

SUMMARY

One general aspect includes a method for diagnosing performance issues in a service function chain having a plurality of resources and a plurality of network functions each having a network function queue. The method includes monitoring each network function queue and dumping queueing information for input packets for each of the plurality of network functions. The method further includes identifying each of the plurality of resources that is under contention and identifying which of the plurality of network functions is a contender for the each of the plurality of resources. A diagnosing algorithm is used to diagnose performance problems and an impact graph for each victim packet is generated. A summary of results as a list of rules is then provided.

Implementations may include one or more of the following features. The method where the performance issues include long tail latency or packet drops. The method where the step of using a diagnosing algorithm includes providing an impact score for each of the plurality of resources that is under contention. The method where the step of identifying each of the plurality of resources that is under contention includes using resource counters to determine how each of the plurality of resources is under contention. The method where the resource counters include symptom counters, resource measurement counters and traffic measurement counters. The method where the step of using a diagnosing algorithm includes running a score back-propagation step for determining which of the plurality of network functions propagate an impact to a victim package. The method further including running the score back-propagation step recursively until all root nodes are back-propagated.

One general aspect includes a system for diagnosing performance issues in a service function chain including a plurality of resources; and a plurality of network functions each having a network function queue. The system includes a processor and a non-volatile computer memory for storing computer instruction coupled to the processor, where processor, responsive to executing the computer instructions, performs the following operations: monitoring each network function queue; dumping queueing information for input packets for each of the plurality of network functions; identifying each of the plurality of resources that is under contention; identifying which of the plurality of network functions is a contender for the each of the plurality of resources; using a diagnosing algorithm to diagnose performance problems; generating an impact graph for each victim packet and generating a summary of results as a list of rules.

Implementations may include one or more of the following features. The system where the performance issues include long tail latency or packet drops. The system where using a diagnosing algorithm includes providing an impact score for each of the plurality of resources that is under contention. The system where identifying each of the plurality of resources that is under contention includes using resource counters to determine how each of the plurality of resources is under contention. The system where the resource counters include symptom counters, resource measurement counters and traffic measurement counters. The system where using a diagnosing algorithm includes running a score back-propagation step for determining which of the plurality of network functions propagate an impact to a victim package. The system where the operations further include running the score back-propagation step recursively until all root nodes are back-propagated.

One general aspect includes a non-transitory, tangible computer-readable medium having computer-executable instructions stored thereon which, when executed by a computer, cause the computer to perform a method for diagnosing performance issues in a service function chain. The service function chain having a plurality of resources and a plurality of network functions each having a network function queue. The method performed by the computer includes monitoring each network function queue; dumping queueing information for input packets for each of the plurality of network functions. The method further includes identifying each of the plurality of resources that is under contention and identifying which of the plurality of network functions is a contender for the each of the plurality of resources. The method uses a diagnosing algorithm to diagnose performance problems and generates an impact graph for each victim packet. The method also includes generating a summary of results as a list of rules.

Implementations may include one or more of the following features. The non-transitory, tangible computer-readable medium where the performance issues include long tail latency or packet drops. The non-transitory, tangible computer-readable medium where using a diagnosing algorithm includes providing an impact score for each of the plurality of resources that is under contention. The non-transitory, tangible computer-readable medium where identifying each of the plurality of resources that is under contention includes using resource counters to determine how each of the plurality of resources is under contention. The non-transitory, tangible computer-readable medium where the resource counters include symptom counters, resource measurement counters and traffic measurement counters. The non-transitory, tangible computer-readable medium where using a diagnosing algorithm includes running a score back-propagation step for determining which of the plurality of network functions propagate an impact to a victim package.

DETAILED DESCRIPTION OF ILLUSTRATIVE EMBODIMENTS

Glossary

AutoFocus is a traffic analysis and visualization tool that describes the traffic mix of a link through textual reports and time series plots. Using traffic clusters, one can divide the traffic into meaningful categories. AutoFocus produces time series plots of the traffic mix with each category in a different color. AutoFocus produces reports and plots for various time periods ranging from weeks to half hour intervals. Also, the user can drill down into separate pages for each category. The filter from the user interface allows drill down into arbitrary directions. AutoFocus accepts two types of input: packet header traces and NetFlow data. Both types of input can be sampled, but AutoFocus only compensates for the sampling in the reports that measure the traffic in bytes and packets, and not in those measuring the traffic in flows.

CAT. Cache Allocation Technology (CAT) provides software control of where data is allocated into the last-level cache (LLC), enabling isolation and prioritization of key applications.

CMT. Cache Monitoring Technology (CMT) allows an Operating System (OS) or Hypervisor/virtual machine monitor (VMM) to determine the usage of cache by applications running on the platform.

Contenders. Contenders are network functions that contend for resources.

DPDK. DPDK is a Data Plane Development Kit that consists of libraries to accelerate packet processing workloads running on a wide variety of CPU architectures. The main goal of the DPDK is to provide a simple, complete framework for fast packet processing in data plane applications. The DPDK framework creates a set of libraries for specific hardware/software environments through the creation of an Environment Abstraction Layer (EAL). The EAL hides the environment specifics and provides a standard programming interface to libraries, available hardware accelerators and other hardware and operating system (Linux, FreeBSD) elements. Once the EAL is created for a specific environment, developers link to the library to create their applications. For instance, EAL provides the frameworks to support Linux, FreeBSD, Intel IA-32 or 64-bit, IBM POWER9 and ARM 32- or 64-bit.

Firewall. A firewall is software used to maintain the security of a private network. Firewalls block unauthorized access to or from private networks and are often employed to prevent unauthorized Web users or illicit software from gaining access to private networks connected to the Internet. A firewall may be implemented using hardware, software, or a combination of both.

Five-tuple. A 5-tuple refers to a set of five different values that comprise a Transmission Control Protocol/Internet Protocol (TCP/IP) connection. It includes a source IP address/port number, destination IP address/port number and the protocol in use.

Impact Score. An Impact Score provides an indication of the impact that . . . .

Light-weight information. Lightweight information is information that is relatively simpler than other information.

Local Score Allocation. Local score allocation is the allocation of an impact score based on the number of packets buffered in the queue due to resource contentions. The goal of local score allocation is to determine where the long latency of the packet comes from, i.e., how the long queue is built up.

NAT. Network address translation (NAT) is a router function that enables public and private network connections and allows single IP address communication. While there are many public networks worldwide, there is a limited number of private networks. NAT was introduced as an effective, timely solution to heavy network volume traffic.

NF. Network Function (NF)—a functional building block within a network infrastructure, which has well-defined external interfaces and a well-defined functional behavior. In practical terms, a Network Function is today often a network node or physical appliance.

NFV Chain. NFV chain defines a list of individual network functions and the sequence policy and Service Level Agreement (SLA) requirements among these functions.

NFV. Network functions virtualization (NFV) is an initiative to virtualize network services traditionally run on proprietary, dedicated hardware. With NFV, functions like routing, load balancing and firewalls are packaged as virtual machines (VMs) on commodity hardware.

Performance Counter. Performance Counters are a form of performance monitoring and debugging tool to aid performance testing of applications. These count a number of actions that both the application and the operating system perform.

Queue Length. Queue length is the number of processing jobs awaiting service at the processor station; the waiting jobs include the jobs waiting to be processed as well as the jobs being considered for remote execution by the load balancing mechanism.

Resource Contention. In computer science, resource contention is a conflict over access to a shared resource such as random access memory, disk storage, cache memory, internal buses or external network devices. A resource experiencing ongoing contention can be described as oversubscribed.

Resource counters (CPU, process, memory, disk and IP network interface utilization counters) are components that count resource consumption of the respective resource caused by data packets belonging to a specific service.

Resources are resources used by an NF node (e.g. CPU resources, cache resources).

Victim Packet. Victim packet is a packet that is dropped because it goes above a queue time threshold.

VNF. Virtual network functions (VNFs) are virtualized tasks formerly carried out by proprietary, dedicated hardware. VNFs move individual network functions out of dedicated hardware devices into software that runs on commodity hardware. These tasks, used by both network service providers and businesses, include firewalls, domain name system (DNS), caching or network address translation (NAT) and can run as virtual machines (VMs).

VNF Chain. A network function involving multiple VNFs.

Figure 1:
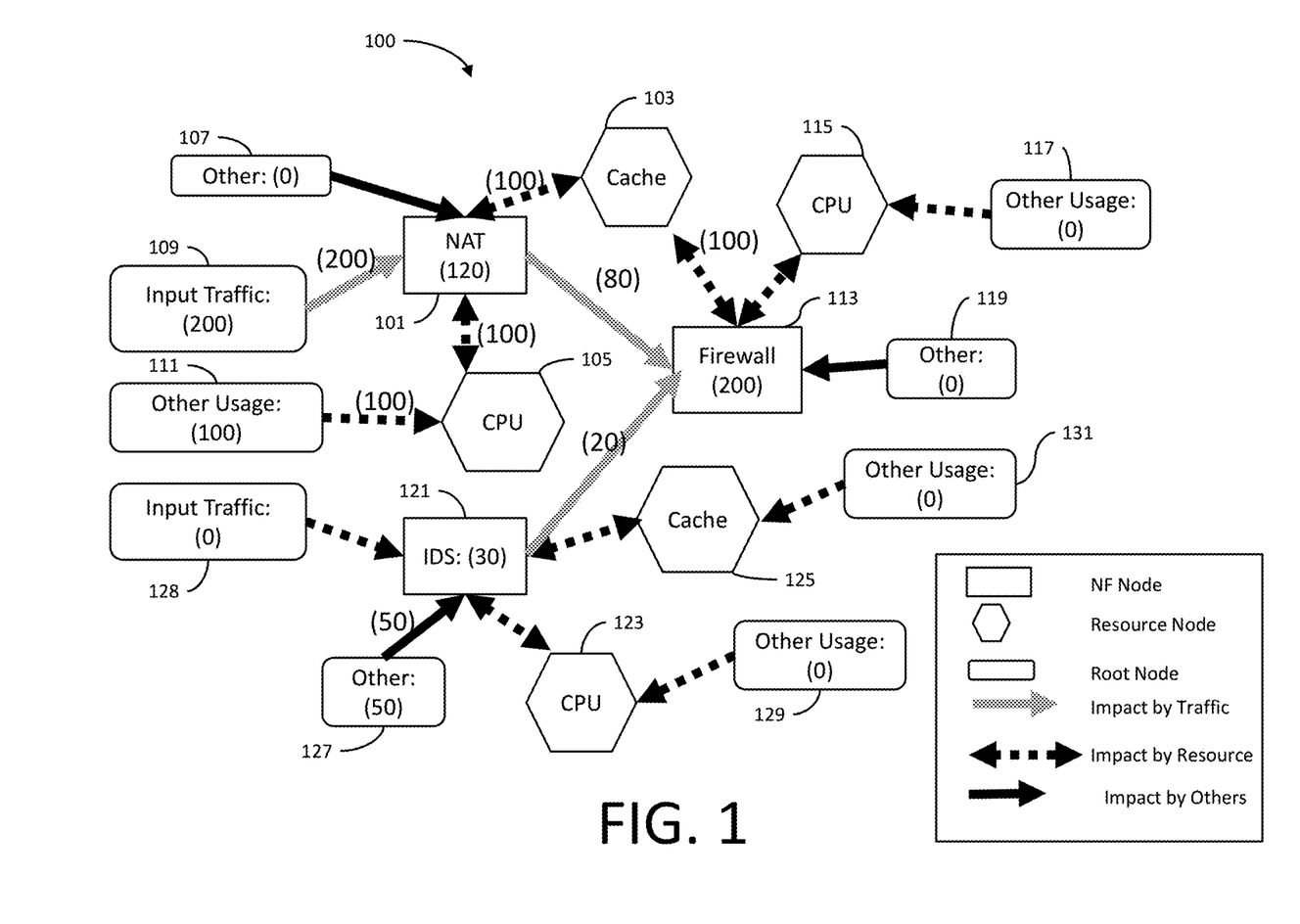
FIG. 1 is a block diagram of a service chain to which the method for diagnosing network function virtualization performance may be applied.

FIG. 1 is a block diagram illustrating a service chain 100 on which the method for diagnosing network function virtualization may be applied. Service chain 100 may include an NAT 101 and may access resources such as cache 103 and CPU 105. NAT 101 may be accessed by other root nodes such as root node 107, and input traffic node 109. CPU 105 may be accessed by other root nodes such as other usage node 111. NAT 101 may access firewall 113 which in turn may access resources such as cash 103 and CPU 115. CPU 115 may be accessed by root node 117 and the firewall may be accessed by root node 119. Service chain 100 may also include an IDS 121 which may access CPU resource 123 in cache resource 125. IDS 121 may be accessed by root node 127 and input traffic node 128. CPU 123 may be accessed by root node 129 and Cache 125 may be accessed by root node 131.

As shown in FIG. 1 the NAT 101 and the firewall 113 share a cache line. If there is a burst of traffic arriving to the NAT 101, which causes resource contention in the shared cache line then the result may be performance problems in the firewall. The operator can choose to isolate the cash line for NAT 101 and firewall 113, or alternatively choose to rate limit the input traffic arriving to NAT 101.

Diagnosis in NFV is challenging. First, usually there are multiple resource contentions mixed together and each could involve many contenders. As shown in FIG. 1, each NF node (e.g. NAT 101, firewall 113, IDS 121) is bound with a queue, a cache resource, and CPU resource. It is difficult to figure out how each resource contention contributes to the problem. Second, a local view of diagnosis is not sufficient. As shown in FIG. 1, the performance problem happens in the firewall 113, then checking resource contentions within the firewall 113 (i.e. the queue in the firewall, cache in the CPU) is not enough, because the root cause can also come from NAT 101 (e.g. NAT 101 sends out bursts of traffic) which is a half away from the firewall 113. Third, the long latency of a packet is not only impacted by the resource contention during the processing of it, but also the contention in history. As shown in FIG. 1 NAT 101 has a long buffered queue due to CPU contention, and it sends out all buffer packets in a burst after the contention resulting in problems in firewall 113. These problems can be overcome by an NFV performance diagnosis system in accordance with the present disclosure.

Figure 2:
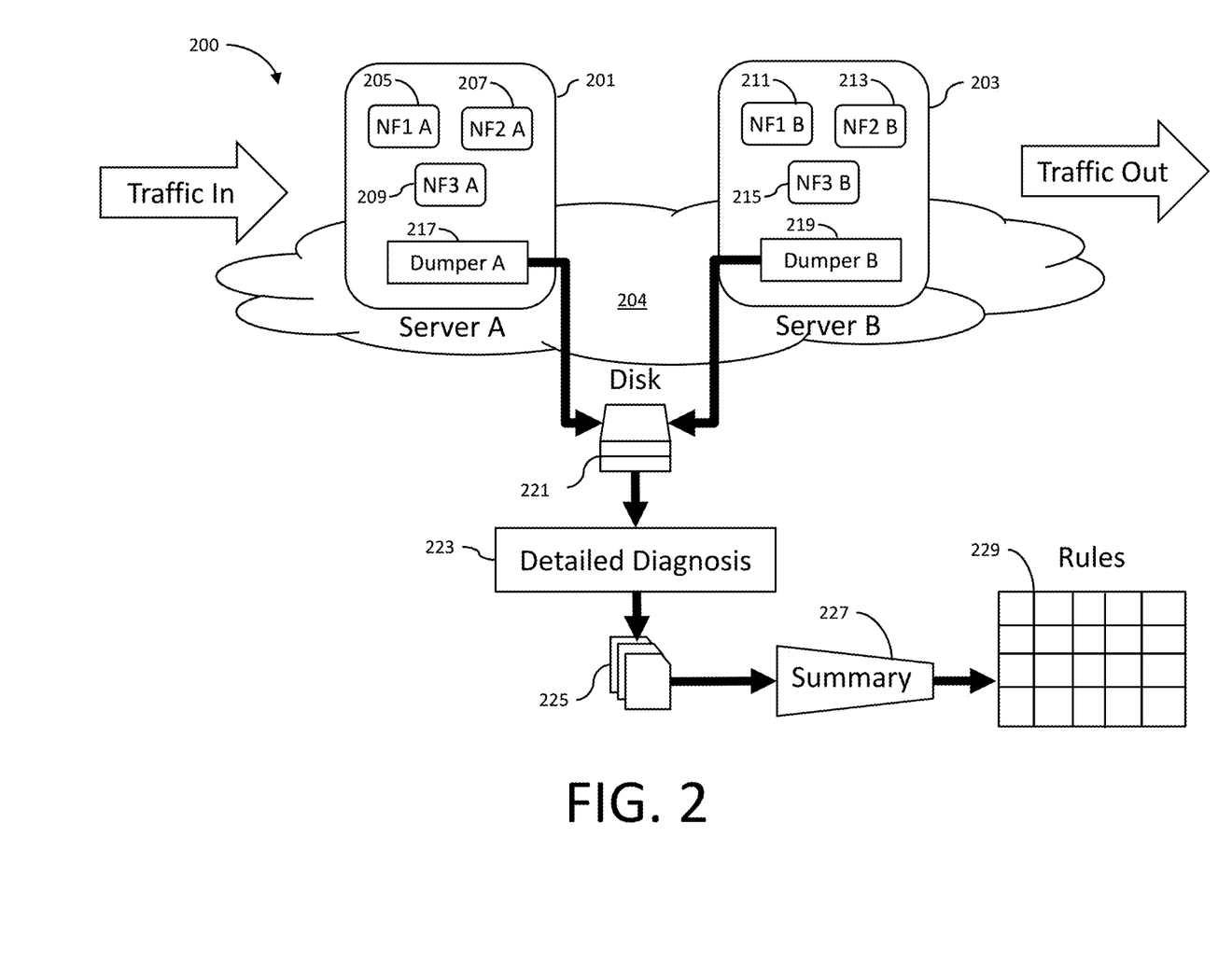
FIG. 2 is a block diagram illustrating the system design of a system for diagnosing network function virtualization performance.

Illustrated in FIG. 2 is an NFV performance diagnosis system 200. The NFV performance diagnosis system 200 includes a plurality of servers (e.g. server A 201 and server B 203 disposed in a network 204. Server A 201 includes a plurality of network functions (e.g. NF1A 205, NF2A 207 and NF3A 209), and server B 203 includes a plurality of network functions (e.g. NF1B 211, NF2B 213 and NF3B 215). Associated with server A is dumper A 217 and associated with server B is dumper B 219. Dumper A 217 and dumper B 219 are components that accomplish the dumping of the queuing information for each input packet for each NF. The packet level queuing information is transferred to a storage device such as disk 221. The packet level queuing information is the processed by a detailed diagnosis application 223. The detailed diagnosis application 223 generates an impact graph 225 which is the summarized at summary component 227 and then converted into a list of rules for operators that include "<when>, <which flow>, at <which hop>, suffers from problems, caused by <which resource contention>".

Figure 3:
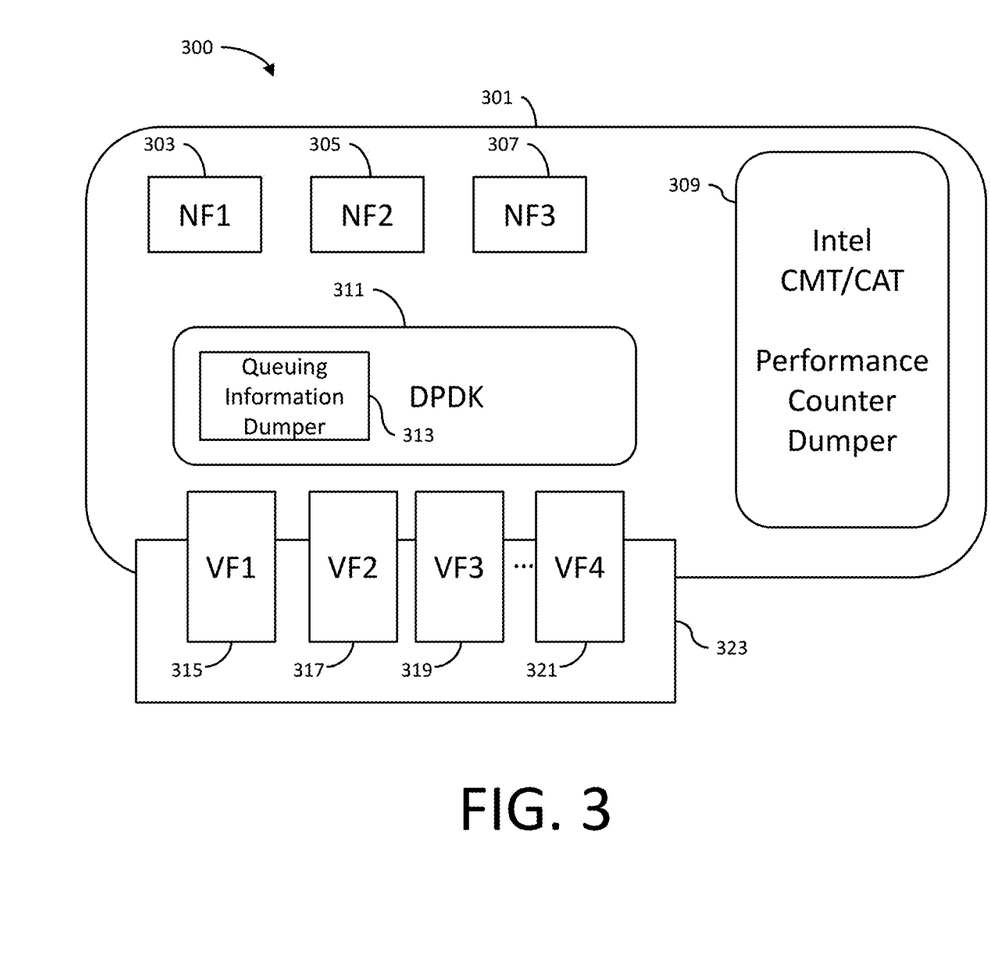
FIG. 3 is a block diagram showing how software is instrumented in an actual server to collect counters and queue information.

FIG. 3 shows how software is instrumented in an actual server to collect counters and queue information. Server 301 includes a plurality of network functions (e.g. NF1 303, NF2 305 and NF3 307). The server also includes a module that monitors and allocates cache usage (e.g. Intel CMT/CAT 309) that acts as a performance counter and dumper. Server 301 also may include a DPDK 311 which acts as a high speed processing library and include queuing information dumper 313. An interface card 323 may be provided to interface virtual functions VF1 315, VF2 317, VF3 319 and VF4 321. The interface card 323 may include additional virtual functions.

Figure 4:
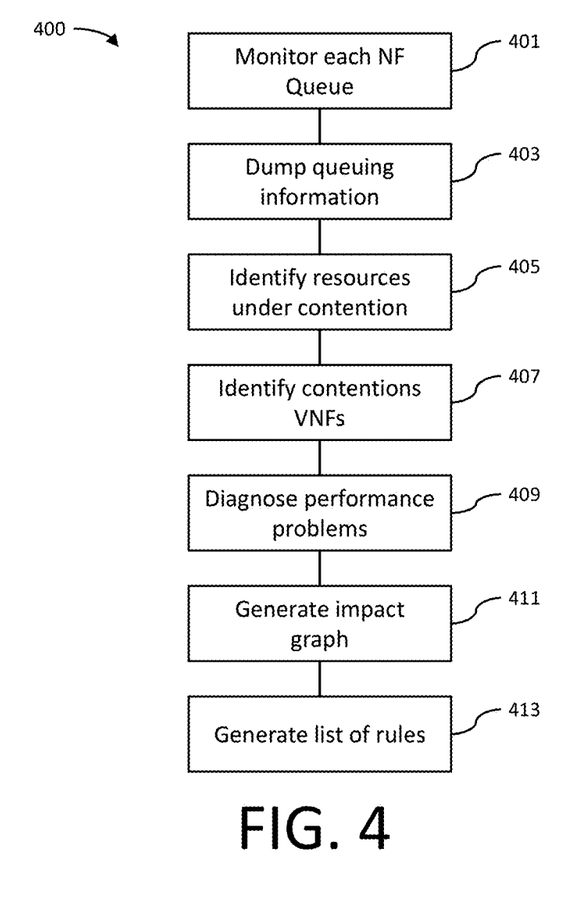
FIG. 4 is a flowchart of a method for diagnosing network function virtualization performance.

Illustrated in FIG. 4 is a method for diagnosing network function virtualization 400.

In step 401, the method 400 monitors each NF queue. With the queuing information from all NFs, the experience of each packet, and how the traffic pattern changes across different NFs can be determined. The method 400 can perform offline diagnosis to identify relevant resource contentions, contenders, and how contentions propagate their impact to the performance problem. The key idea of method 400 is to leverage packet-level queuing information. Method 400 will dump the queuing information for each input packet for each NF, and the information includes: 1) five-tuple, 2) timestamp, 3) queue length, and 4) packet ID (which is used for identifying each packet). The packet-level queuing information is significant because when performance problems happen, the method 400 can determine how the input queue is built up, and which packets are responsible for the built-up queue. Second, the queuing information describes how the traffic pattern changes across different NFs, and the traffic pattern change indicates the propagation of the impact of resource contentions. Third, with five-tuples of each packet, the method 400 can generate traffic patterns that are significant in performance problems.

In step 403, the method 400 dumps the queuing information to a data store.

In step 405, the method 400 identifies the resources under contention. This is accomplished through the use of resource counters. For example, Symptom Counters may include determination of the End-to-end latency of each packet; the latency of each packet within each NF; the packet loss within each NF; the packet loss rate for each flow; and the tail latency for each flow. Resource Measurement Counters may determine CPU usage for each NF; Cache misses for each NF; Kernel lock usage for each NF; and Memory bandwidth for each NF. Traffic Measurement Counters may determine the number of packets arrived at each NF; the number of packets processed by each NF; the flow distribution received by each NF; and the flow distribution sent by each NF. With the resource counters, how each resource is under contention at any time may be determined. As a result, for each performance problem, all of the resource contentions that contribute to the problem, as well as all relative contenders may be determined. Furthermore, we can also know how the resource contention changes the traffic pattern, and propagates its impact to the final problem.

In step 407, the method 400 identifies the contentions VNFs.

In step 409, the method 400 diagnoses the performance problems. The diagnosis is performed by a diagnosis algorithm. As mentioned above, the method 400 leverages packet-level queuing information to diagnose the performance problem. Therefore, the method 400 will perform diagnosis on every packet suffering from performance problems (either long latency or packet drop). The diagnosis algorithm can be divided into 2 steps: 1) local score allocation and 2) score back-propagation.

The goal of the local resource allocation is to determine where the long latency of the packet comes from, i.e., how the long queue is built up. This is accomplished by considering the "queuing interval" rather than the actual queue content. Queuing interval means the time period from the time when the queue started to build up to the time when a victim packet arrives. Queuing interval is used because the impact of resource contentions can come from traffic in history. Another concept in this step is to define an impact score that can be comparable across different resource contentions. The score is based on the number of packets buffered in the queue due to resource contentions. For example, either a burst of flows or CPU shortage can buffer packets in the queue, because the NF cannot process the high input load in time. In this way, the number of packets buffered in the queue represents how different types of resource contentions impact the performance. Therefore, a general way to quantify the impact of different types of contentions is provided.

The goal of Score back-propagation is to determine which components propagate their impact to the victim packet. The key idea is to figure out the correct set of packets that help to propagate the impact. For example, if the impact is propagated by sending higher rate traffic, the set of packets in the higher rate traffic must be determined. If the impact is propagated through a shared resource, then there is a need to determine which NF is the contender, and which set of packets make the NF over-utilizes the resource. The score back-propagation will be run recursively, until all scores are back propagated to the root nodes. After finishing, an impact graph for a single victim packet can be obtained.

In step 411 the method 400 generates an impact graph. The impact graph to show the diagnosis result. The impact graph consists of different components in the NFV chain, and the links between components describe how different components impact each other through different ways. FIG. 1 shows an example of the impact graph. Each node is provided with a score to show how resource contentions impact this node. Each link is provided with a score to show how much impact is propagated. For example, the NAT 101 receives impact from input traffic 109 for 200 scores, and receives 100 scores from CPU 105. It then propagates 100 scores to the cache 103, and propagates 80 scores to the Firewall 113. The rest 120 scores represent how resource contentions impact the NAT 101.

In step 413, the method 400 generates a list of rules. After getting the impact graph for each victim packet, a list of rules that can summarize the diagnosis result can be generated. The key idea is to find the rule based on all independent impact graph. For each NF, an AutoFocus algorithm may be used to find out the significant flow pattern. Based on packets in the flow pattern and their impact graph, how all resource contentions propagate their impact to the flow pattern may be derived. An accurate rule for those victim packets may then be generated. As stated above, the list of rules for operators, may include "<when>, <which flow>, at <which hop>, suffers from problems, caused by <which resource contention>". A score for each rule to quantify how the resource contention contributes to the problem may be provided.

Figure 5:
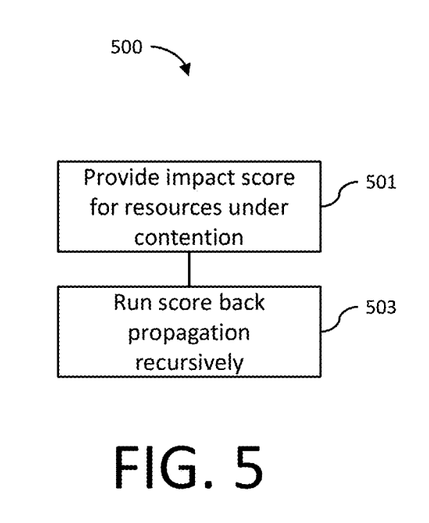
FIG. 5 is a flowchart of a method implemented by an algorithm for diagnosing network function virtualization performance.

FIG. 5 is a flowchart of a method 500 implemented by the diagnosis algorithm.

In step 501 the diagnosis algorithm provides impact score for resources under contention.

In step 503 the diagnosis algorithm runs a score back propagation recursively.

In view of the many possible embodiments to which the principles of this invention may be applied, it will be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed:

1. A method for diagnosing performance issues in a service function chain having a plurality of resources and wherein the service function chain has a plurality of network functions, each of the plurality of network functions having a network function queue, comprising:
- monitoring each network function queue;
- dumping queueing information for input packets for each of the plurality of network functions;
- identifying, from the dumped queueing information, each of the plurality of resources that is under contention;
- determining which of the plurality of network functions is a contender for the each of the plurality of resources;
- using a diagnosing algorithm to diagnose performance problems based on the determining step;
- generating an impact graph for each victim packet identified by the algorithm as a result of a performance problem; and
- generating a summary of results of the diagnosing algorithm as a list of rules.

2. The method of claim 1 wherein the performance issues comprise long tail latency or packet drops.

3. The method of claim 1 wherein the step of using a diagnosing algorithm comprises providing an impact score for each of the plurality of resources that is under contention.

4. The method of claim 1 wherein the step of identifying each of the plurality of resources that is under contention comprises using resource counters to determine how each of the plurality of resources is under contention.

5. The method of claim 4 wherein the resource counters comprise symptom counters, resource measurement counters and traffic measurement counters.

6. The method of claim 1 wherein the step of using a diagnosing algorithm comprises running a score back-propagation step for determining which of the plurality of network functions propagate an impact to a victim packet.

7. The method of claim 6 further comprising running the score back-propagation step recursively until all root nodes are back-propagated.

8. A system for diagnosing performance issues in a service function chain comprising:
- a plurality of resources;
- a plurality of network functions each having a network function queue;
- a processor;
- a non-volatile computer memory for storing computer instruction coupled to the processor, wherein processor, responsive to executing the computer instructions, performs operations comprising:
  - monitoring each network function queue;
  - dumping queueing information for input packets for each of the plurality of network functions;
  - identifying, from the dumped queueing information, each of the plurality of resources that is under contention;
  - determining which of the plurality of network functions is a contender for the each of the plurality of resources;
  - using a diagnosing algorithm to diagnose performance problems based on the determining step;
  - generating an impact graph for each victim packet identified by the algorithm as a result of a performance problem; and
  - generating a summary of results of the diagnosing algorithm as a list of rules.

9. The system of claim 8 wherein the performance issues comprise long tail latency or packet drops.

10. The system of claim 8 wherein using a diagnosing algorithm comprises providing an impact score for each of the plurality of resources that is under contention.

11. The system of claim 8 wherein identifying each of the plurality of resources that is under contention comprises using resource counters to determine how each of the plurality of resources is under contention.

12. The system of claim 11 wherein the resource counters comprise symptom counters, resource measurement counters and traffic measurement counters.

13. The system of claim 8 wherein using a diagnosing algorithm comprises running a score back-propagation step for determining which of the plurality of network functions propagate an impact to a victim packet.

14. The system of claim 13 wherein the operations further comprise running the score back-propagation step recursively until all root nodes are back-propagated.

15. A non-transitory, tangible computer-readable medium having computer-executable instructions stored thereon which, when executed by a computer, cause the computer to perform a method for diagnosing performance issues in a service function chain having a plurality of resources and wherein the service chain has a plurality of network functions, each of the plurality of network functions having a network function queue, comprising:
- monitoring each network function queue;
- dumping queueing information for input packets for each of the plurality of network functions;
- identifying, from the dumped queueing information, each of the plurality of resources that is under contention;
- determining which of the plurality of network functions is a contender for the each of the plurality of resources;
- using a diagnosing algorithm to diagnose performance problems based on the determining step;
- generating an impact graph for each victim packet identified by the algorithm as a result of a performance problem; and
- generating a summary of results of the diagnosing algorithm as a list of rules.

16. The non-transitory, tangible computer-readable medium of claim 15 wherein the performance issues comprise long tail latency or packet drops.

17. The non-transitory, tangible computer-readable medium of claim 15 wherein using a diagnosing algorithm comprises providing an impact score for each of the plurality of resources that is under contention.

18. The non-transitory, tangible computer-readable medium of claim 15 wherein identifying each of the plurality of resources that is under contention comprises using resource counters to determine how each of the plurality of resources is under contention.

19. The non-transitory, tangible computer-readable medium of claim 18 wherein the resource counters comprise symptom counters, resource measurement counters and traffic measurement counters.

20. The non-transitory, tangible computer-readable medium of claim 15 wherein using a diagnosing algorithm comprises running a score back-propagation step for determining which of the plurality of network functions propagate an impact to a victim package.

* * * * *

UNITED STATES PATENT AND TRADEMARK OFFICE
CERTIFICATE OF CORRECTION

| | |
|---|---|
| PATENT NO. | : 11,349,774 B2 |
| APPLICATION NO. | : 16/714117 |
| DATED | : May 31, 2022 |
| INVENTOR(S) | : Muhammad Bilal Anwer et al. |

It is certified that error appears in the above-identified patent and that said Letters Patent is hereby corrected as shown below:

On the Title Page

In Assignees item (73), replace "AT&T Intellectual Property 1, L.P." with "AT&T Intellectual Property I, L.P."

Signed and Sealed this
Twenty-eighth Day of June, 2022

Katherine Kelly Vidal
*Director of the United States Patent and Trademark Office*